United States Patent [19]

Shook

[11] 3,872,682

[45] Mar. 25, 1975

[54] CLOSED SYSTEM REFRIGERATION OR HEAT EXCHANGE

[75] Inventor: Hugh Thomas Shook, West Covina, Calif.

[73] Assignee: Northfield Freezing Systems, Inc., Northfield, Minn.

[22] Filed: Mar. 18, 1974

[21] Appl. No.: 451,729

[52] U.S. Cl. .................................. 62/114, 62/502
[51] Int. Cl. .......................................... F25b 9/00
[58] Field of Search ............ 62/114, 115, 9, 40, 502

[56] References Cited
UNITED STATES PATENTS

| | | | |
|---|---|---|---|
| 2,378,815 | 6/1945 | Wikoff | 62/114 X |
| 2,794,322 | 6/1957 | Etherington | 62/114 |
| 2,794,329 | 6/1957 | Herrick | 62/114 |
| 3,019,614 | 2/1962 | Schubert et al. | 62/114 |
| 3,203,194 | 8/1965 | Fuderer | 62/114 |
| 3,393,152 | 7/1968 | Smith et al. | 62/40 UX |
| 3,400,545 | 9/1968 | Hendal | 62/114 X |
| 3,698,202 | 10/1972 | Missimer | 62/114 |

FOREIGN PATENTS OR APPLICATIONS

| | | | |
|---|---|---|---|
| 635,337 | 1/1962 | Canada | 62/114 |

Primary Examiner—William F. O'Dea
Assistant Examiner—Peter D. Ferguson

[57] ABSTRACT

The disclosed process is particularly well suited for a refrigeration or other heat exchange system employing a plurality of refrigerants. The preferred refrigerants are carbon dioxide and a haloalkane boiling in the range of −40°C. to +40°C. The haloalkane, in a liquid state, should be substantially immiscible in liquid carbon dioxide. In a typical system of this invention, the compressor compresses a $CO_2$/haloalkane charge, and the compressed mixture is cooled in a condenser, allowing the haloalkane to condense. The condensed haloalkane and cooled, non-condensed carbon dioxide pass into a heat exchanger, where the haloalkane is further cooled and the carbon dioxide is condensed. The two substantially immiscible refrigerant liquids are then mixed in a homogenizer and promptly passed through an expansion valve into an evaporator. The effluent from the expansion valve can contain particles of solid carbon dioxide which are sublimated to the gaseous state for ultimate recycling to the compressor. This system has an outstanding cooling capacity in view of its energy requirements, which are relatively low compared to typical closed cycle carbon dioxide-containing refrigeration systems.

11 Claims, 1 Drawing Figure

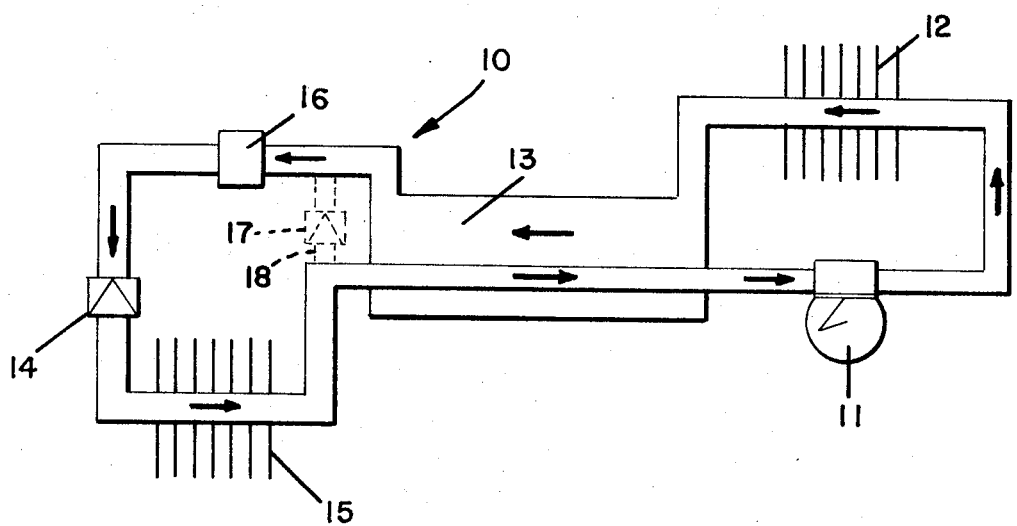

CLOSED SYSTEM REFRIGERATION OR HEAT EXCHANGE

FIELD OF THE INVENTION

This invention relates to a closed cycle or compression system and process for heat exchange (e.g. refrigeration). An aspect of this invention relates to "cold air" type refrigeration as opposed to "cold gas" refrigeration. Another aspect of this invention relates to closed cycle refrigeration as opposed to refrigeration systems which use non-recoverable refrigerants. Still another aspect of this invention relates to multi-refrigerant systems such as binary or ternary systems.

DESCRIPTION OF THE PRIOR ART

In some industries (e.g., the food processing or storing industries) very low temperature refrigeration conditions (e.g., refrigeration to temperatures below about −60°F. or −50°C.) can be extremely useful and can increase the efficiency of food processing. For small industrial installations, non-recoverable or "cold gas" refrigeration systems provide a simple means for obtaining such low temperatures. The cold gas is typically nitrogen or carbon dioxide, evaporated from a refrigerant reservoir so as to come into direct contact with the objects to be cooled or frozen. For larger installations, these non-recoverable systems are impractical, and a means for recycling the carbon dioxide, nitrogen, or the like is virtually an economic necessity. In one large food processing plant presently in operation, the cold carbon dioxide is conveyed to compressors which reliquefy it, thus permitting recycling and re-evaporation and greatly reduced refrigerant losses. The aforementioned installation could still be characterized as a cold gas system. It can operate at temperatures below −90°F. (−68°C.), a temperature range which makes the food processing particularly efficient.

With cold air systems, on the other hand, the refrigerant never comes in contact with the object to be cooled or frozen. The refrigeration chamber contains air which is cooled by the low pressure or evaporation end of the closed refrigeration cycle. The commonest refrigerants used in cold air, closed cycle, compression systems are ammonia and the alkanes or haloalkanes (e.g., the chlorinated and/or fluorinated methanes and ethanes). Other refrigerants have been used, however, including air, nitrogen, carbon dioxide, $SO_2$, and even the noble gases such as neon or helium. However, immense compression and suction pressures are typically required when these very low boiling refrigerants (air, carbon dioxide, etc.) are used. In a closed cycle compression carbon dioxide refrigerant system, for example, 700 – 1,000 p.s.i. and a suction pressure of 300 p.s.i. is not unusual, and thermodynamic and mechanical losses detract from efficiency.

Multi-refrigerant refrigeration systems are a fairly recent development in the history of this art. It has been found that greater cooling capacity can be achieved with mixtures (usually binary mixtures) of refrigerants which have widely differing boiling points and which are at least partially miscible in the liquid phase. It is generally a feature of multi-refrigerant systems that the mixture of refrigerants is compressed, the higher boiling component is partially condensed from compressed vapors of the mixture in a first condensation stage, the resulting condensed and vapor phases are separated, the separated vapors of the lower boiling component are condensed in a second condensation stage, the condensed components are expanded and evaporated to produce the desired refrigeration temperature, and the vapors from the evaporator are mixed and recycled to the compression stage. This type of refrigeration process is particularly well suited to compatible mixtures of refrigerants, e.g., "Freons" of widely differing boiling points. (Freon is a trademark of the E.I. duPont Company).

It has been suggested that more complex multi-refrigerant systems can achieve even lower temperatures, e.g. by "cascading" and by using a mixture of N refrigerants and N-1 vapor-liquid separators and heat interchangers. In such systems, N can be three or more. Another proposal for increasing the efficiency of binary refrigerant systems is to provide an evaporator by-pass which is open only during start-up.

As representative of these various aspects of the prior art, see U.S. Pat. Nos. 3,203,194 (Fuderer), issued Aug. 31, 1965; 3,733,845 (Lieberman), issued May 22, 1973; and 3,698,202 (Missimer), issued Oct. 17, 1972.

SUMMARY OF THE INVENTION

Briefly, this invention involves the use of two or more refrigerants or refrigerant compositions which are substantially immiscible in the liquid phase and are capable of cooperating to provide the advantages of a binary refrigerant system without separation of liquid and gaseous phases prior to expansion in the evaporator or low-pressure portion of the refrigeration cycle. In this invention, the substantially immiscible refrigerants are actually homogenized prior to expansion in the low-pressure part of the cycle.

This invention is particularly well suited to the use of carbon dioxide as one of the substantially immiscible refrigerant components. It has been found that carbon dioxide can be used in a multi-refrigerant system with, for example, one or more Freon-type haloalkanes. The compressed $CO_2$/haloalkane mixture is compressed and the haloalkane is condensed. The condensed haloalkane and the cooled, non-condensed $CO_2$ are then cooled further so that the $CO_2$ is condensed to a liquid. The two substantially immiscible liquids are homogenized and promptly passed through an expansion valve into the evaporator. The effluent from the expansion valve is fine particles of solid $CO_2$ fluidized by the haloalkane. This phase relationship is extremely advantageous, since it permits the system to make use of the enormous heat of sublimation of carbon dioxide before the resulting $CO_2$ gas and haloalkane gas are returned to the compressor.

A system of this invention can produce refrigeration temperatures in a cold air chamber which can be as high as −10°F (−23°C.) or as low as −140°F. (−95°C.). To provide refrigeration temperatures in the range of −70°F. to −100°F. (−57°C. to −73°C.), a system of this invention requires only conventional cold air, closed cycle compression equipment and reasonable power and compression requirements. For example, this system can operate at 20 atmospheres in the high pressure part of the cycle and below 3 atmospheres suction pressure. A system of this invention can have more flexibility than prior art systems in that it can operate over a greater range of temperatures without any need for cascaded cycles. Furthermore, the system permits the use of carbon dioxide — one of the most inexpensive refrigerants known.

BRIEF DESCRIPTION OF THE DRAWING

The Drawing is a schematic of the basic refrigeration cycle of this invention.

DETAILED DESCRIPTION

For convenience of description, the term "boiling" (as in "boiling point", "higher boiling refrigerant", etc.) is used herein to refer to a liquid-to-gas phase change under appropriately selected conditions (e.g., superatmospheric pressure) wherein the phases under consideration can all assume the liquid state. Under atmospheric pressure, then, a boiling point (as used herein) could be a sublimation temperature and the higher boiling refrigerant could be the one that has the higher of two boiling points or sublimation temperatures.

Although this invention relates generally to a multirefrigerant heat exchange system wherein the higher and lower boiling refrigerant components are substantially immiscible and are liquefied and physically blended prior to expansion in the low-pressure portion of the heat exchange or refrigeration cycle, this detailed will focus primarily on the use of carbon dioxide with other refrigerants (preferably higher boiling) which are immiscible with carbon dioxide in the liquid phase. Although carbon dioxide has been used in various types of closed cycle systems, the temperature range produced by such systems has been historically somewhat limited and three or more stages of compression or a cascade system have often been needed to recycle the gas. In view of these difficulties and the various advantages of carbon dioxide noted previously, the manner in which this invention uses carbon dioxide is believed to constitute a significant feature of the invention in itself.

Carbon dioxide does not assume a liquid state at atmospheric pressure. It sublimes at $-78.52°C$. ($-109.34°F$). Under, for example, more than 5 atmospheres pressure, carbon dioxide can be a liquid. Its freezing point at 5.2 atmospheres pressure is $-56.6°C$. As is known in the art of liquefying natural gas, the heat of sublimation of carbon dioxide (135 calories per gram) makes it a very effective cold carrier. See U.S. Pat. No. 3,400,545 (Hendal), issued Sep. 10, 1968. However, the suction pressure at 5°F. is 331.8 p.s.i.a. and the head pressure at 86°F. is 1,039.6 p.s.i.a. These values are much higher than the corresponding values for ammonia, sulfur dioxide, and Freons. Nevertheless, the Drawing illustrates a system whereby a combination of carbon dioxide and R-12 (diflurodichlromethane) can be used with conventional refrigeration equipment and a suitable homogenizer (e.g., a conventional homogenizer of the capillary type). R-12 or "refrigerant - 12" as it is sometimes called is, of course, one of the Freons. In the liquid state, it is considered immiscible with liquid $CO_2$.

Turning now to the Drawing, a suitable charge for the refrigeration apparatur 10 is 5 – 95 percent (by weight or volume) $CO_2$ and 95 – 5 percent (by weight or volume) R-12, e.g. 50 percent $CO_2$ and 50 percent R-12. As the amount of $CO_2$ approaches 95 wt. percent, its power requirements of the system go up significantly. As the amount of R-12 (or other haloalkane) approaches 95 Vol. percent, the system behaves more and more like a conventional air conditioning systems and has less and less cooling capacity. Compressor 11 compresses the charge to approximately 20 atmospheres. The compressed mixture is cooled in condenser 12, allowing the R-12 to condense. The condensed R-12 and cooled, non-condensed $CO_2$ pass into the outer circuit of counter flow heat exchanger 13, where the R-12 is sub-cooled and the $CO_2$ is condensed and sub-cooled to a temperature below 0°F. and above $-69.9°F$. The liquid $CO_2$ and liquid R-12 are mixed in homogenizer 16, being immiscible substances by nature, and promptly passed through expansion valve 14 into evaporator 15 held at a suction pressure below 3 atmospheres. The effluent from the expansion valve comprises fine particles of solid $CO_2$ fluidized by R-12.

The $CO_2$ is sublimated to a gas, holding the mixture at a temperature closely approaching the saturation point of $CO_2$ at the present suction pressure determined by the capacity of the compressor 11. (At 10 p.s.i.g., evaporator temperatures below $-90°F$. have been obtained.) Substantially all the $CO_2$ is sublimated in evaporator 15, which discharges the low temperature R-12 liquid and $CO_2$ gas into the inner tube of counter-current heat exchanger 13.

The low temperature R-12 on the inner tube first cools the mixture on the outer tube and is warmed to saturation where it proceeds to evaporate at the present partial pressure, supplying refrigeration to condense the $CO_2$ on the outer circuit of the counter-current heat exchanger and is returned to compressor 11.

An optional, but preferred, feature of the basic cycle shown in the drawing makes use of a start-up bypass 18 including an expansion valve 17, both shown in phantom. During start-up, bypass 18 communicates with the inner and outer circuits of heat exchanger 13 (bypassing evaporator 15 and providing fast pull down of heat exchanger 13), allowing the system to operate at reduced heat pressure. Valve 17 (hence bypass 18) is automatically removed from the system after start-up.

The foregoing description relates to a relatively simple closed circuit refrigeration system, and more complex systems will occur to those skilled in the art. For example, a liquid separator, a four-circuit counter-current heat exchanger, and separate compressors for the $CO_2$ and the R-12 could be used in a system of this invention. Such a system could also include a condenser just for the R-12 and an evaporator just for the $CO_2$. However, it is generally preferred in the practice of this invention avoid a liquid separation step.

This invention is not limited to binary refrigerant systems. Ternary systems including, for example, nitrogen are also useful where even lower temperatures are desired. (The boiling point of liquid nitrogen is $-196°C$.). When carbon dioxide is used in a system of this invention, it is preferred that other refrigerants used in the system be chemically inert towards it. Thus, ammonia is not ordinarily preferred in combination with carbon dioxide due to the possibility of acid-base reactions.

Liquids or gases which have a strong solvating effect on carbon dioxide are also not preferred in such combinations. For example, carbon dioxide and methanol tend to form a gel.

Sulfur dioxide is not preferred because of its toxicity; however, in other respects (e.g., boiling point) it is suitable.

On the other hand, the conventional alkane and haloalkane refrigerants (including azeotropic haloalkane mixtures) are generally well suited to this invention and are particularly preferred among hydrocarbons and halohydrocarbons generally. Particularly good results can be obtained with alkanes and haloalkanes having 1 to 3 carbon atoms and 0 to 8 (e.g., 0 to 4) halogen substituents, e.g., fluorine, chlorine or bromine. As is known in the art, some unsaturated hydrocarbons such as ethylene have been successfully used as refrigerants.

As a general rule, the haloalkanes used as refrigerant components in this invention have a boiling point under atmospheric pressure which is above the sublimation temperature of carbon dioxide at atmospheric pressure, i.e., above −109.34°F. (−78.52°C.). Typically, these haloalkanes boil at temperatures above −40°C. but not higher than about +40°C. Thus, a refrigeration composition of this invention contains at least one high boiling component and one low boiling component (the word boiling being used here as defined previously), and the low and high boiling components ordinarily differ in boiling point (or sublimation temperature) by more than 30°C. at atmospheric pressure. At pressures above 5 atmospheres, carbon dioxide can be a liquid and, of course, is still relatively low in boiling point compared to the boiling point (under the same super-atmospheric pressure conditions) of the commonly used haloalkane refrigerants.

Thus, like the Fuderer system described in U.S. Pat. No. 3,203,194, the refrigerant components differ substantially in boiling point. Unlike this prior art system, however, carbon dioxide and haloalkanes (or alkanes or similar refrigerants which do not chemically interact with carbon dioxide) are substantially immiscible. In the liquid state, a refrigerant of this invention is typically a dispersion of one refrigerant in the other, e.g., a dispersion of carbon dioxide droplets in a continuous liquid haloalkane phase. If desired, a charge for a refrigeration system of this system can be pre-mixed and stored at atmospheric or super-atmospheric pressure. Since the refrigerant components tend to separate, means should be provided to restore the dispersion.

As will be apparent from the foregoing disclosure, a process of this invention is particularly well suited to refrigeration, e.g., refrigeration in the food processing industry wherein the chamber to be cooled houses a conveying system such as a spiral conveyor. Other uses of this system will occur to the skilled artisan, including process cooling for dies (where extremely high density cooling is required) and other cooling or heat exchange processes. As is known in the art, the refrigeration cycle of this invention can be used as a "heat pump," whereby the area surrounding the condenser is heated.

In its broadest aspect, the process of this invention involves compressing the refrigerant mixture, passing the compressed mixture through a condensing stage to condense the higher boiling component, passing the resulting partially condensed mixture through a cooling zone to condense the lower boiling component (resulting in a two-phase heterogeneous refrigerant liquid), blending the heterogeneous refrigerant liquid in a homogenizing zone to obtain a more uniform mixture, and expanding the homogenized refrigerant liquid. In the evaporator, at least a major amount of the lower boiling component evaporates. At least some of the higher boiling component does not evaporate until after the expanded refrigerant system has been discharged from the evaporator. The subsequent evaporation can be used very advantageously to cool the compressed mixture being fed to the homogenizer and the expansion valve. This can be conveniently accomplished with a counter-current heat exchanger (e.g., heat exchanger 13 of the Drawing).

The use of exotic refrigeration apparatus in this invention is not necessary. The compressor (e.g., a positive displacement type) or other compressing system (e.g., a gas fired compression system) can generally be the same type used in air conditioning systems. Preferably, the compressor can provide at least 5 atmospheres pressure but need not provide 700 p.s.i.a. or more, as is the case with most closed cycle refrigerant systems using carbon dioxide. For example, 30 atmospheres pressure or less is ordinarily sufficient. The suction pressure in the evaporator need not be anywhere near the 300 p.s.i.a. commonly used in closed cycle carbon dioxide refrigeration systems; 5 atmospheres or less will provide temperatures well below −55°C. and typically below −65°C.

Similarly, condensers, heat exchangers, homogenizers, expansion valves, evaporators, and other components of the refrigeration apparatus can be conventional. Both air cooled and water cooled condensers can be used. Although it is not essential to the practice of this invention, additional refrigeration systems can be cascaded with a system of this invention, e.g., to cool and condense the lower boiling component of the refrigeration system down to the liquid state (a function that is ordinarily performed by heat exchanger 13 of the Drawing).

Condenser 12 can be the conventional type having a receiver for condensed refrigerant. This would result in some slight separation of the refrigerant components in the condenser, and the separated, higher boiling refrigerant collected in the receiver (e.g., R-12) can be used in counter-current heat exchanger 13 to condense the carbon dioxide or lower boiling refrigerant.

What is claimed is:

1. A closed cycle heat exchange process using a mixture of refrigerants, which comprises the steps of:
    a. compressing a mixture of refrigerant components comprising carbon dioxide, at least two of said refrigerant components (1) being substantially immiscible when both are in a liquid state and (2) having different boiling points;
    b. passing said compressed mixture through a condensing stage to condense the higher boiling component of said two components;
    c. passing the resulting partially condensed mixture through a cooling zone to condense the lower boiling component of said two components, whereby two immiscible liquids are obtained;
    d. blending said two immiscible liquids in a homogenizing zone to obtain a generally uniform mixture;
    e. expanding and converting at least said lower boiling component to a gaseous state in a closed evaporating zone;
    f. evaporating said higher boiling component, thereby obtaining said mixture of refrigeration components of step (a) for recycling of said mixture of refrigeration components in accordance with said closed cycle heat exchange process.

2. A process according to claim 1, wherein said cooling zone of said step (c) comprises a heat exchange zone and said partially condensed mixture becomes a first current in said heat exchange zone; and wherein evaporated lower boiling component and said higher boiling component passing from said evaporating zone are passed to said heat exchange zone to form a second current in said heat exchange zone; whereby, due to the resulting heat exchange, said higher boiling component in said second current is evaporated and the lower boiling component in said partially condensed mixture in said first current is cooled.

3. A process according to claim 1 wherein the compression used in compressing step (a) is greater than 5 atmospheres but less than about 700 p.s.i.a. and wherein the suction pressure in said evaporating zone is less than 5 atmospheres.

4. A process according to claim 3 wherein said compression is less than 30 atmospheres, said suction is less than 3 atmospheres, and the refrigeration temperature provided by said evaporating zone is colder than −55°C.

5. A process according to claim 1 wherein said mixture of refrigerants further comprises a haloalkane having a carbon chain ranging from one to two carbon atoms and at least one halogen substituent selected from the group consisting of fluorine, chlorine, and bromine, and wherein said haloalkane has a boiling point at atmospheric pressure which is above the sublimation temperature of carbon dioxide at atmospheric pressure.

6. A process according to claim 5 wherein the compression used in compressing step (a) is greater than 5 atmospheres but less than 700 p.s.i.a. and the suction pressure in said evaporating zone is less than 5 atmospheres.

7. A process according to claim 6 wherein said compression is less than 30 atmospheres and said suction pressure is less than 3 atmospheres.

8. A process according to claim 5 wherein the mixture of refrigerants in said evaporating zone comprises particles of solid carbon dioxide fluidized by liquid haloalkane, and wherein the major amount of solid particles sublime to form gaseous carbon dioxide in said evaporator zone, thereby providing a refrigeration temperature colder than −55°C. external to said evaporator zone.

9. A process according to claim 1 wherein said step (a) is a single stage compression.

10. In a closed cycle refrigeration process using a mixture of refrigerant components of differing boiling points comprising the steps of compressing said mixture of refrigerant components in a compression stage, condensing the higher boiling and lower boiling refrigeration components in the compressed mixture in a seriatim fashion, expanding and evaporating the condensed components, and recycling the resulting gases to the compression stage, the improvement which comprises:

blending compressed, condensed carbon dioxide with at least one other compressed, condensed, higher boiling refrigeration component in a homogenizing zone prior to said expanding step;

expanding the resulting blended mixture of refrigerant components in an evaporator zone to obtain a mass of discrete, solid carbon dioxide particles fluidized by said higher boiling refrigeration component; and subliming said carbon dioxide particles while said particles are fluidized by said higher boiling refrigeration component.

11. A closed cycle refrigeration process using a mixture of refrigerants, which comprises the steps of:

a. compressing a mixture of refrigerant components, at least two of said refrigerant components (1) being substantially immiscible when both are in a liquid state and (2) having different boiling points, said compressing step being carried out at less than 700 p.s.i.a.;

b. passing said compressed mixture through a condensing stage to condense the higher boiling component of said two components;

c. passing the resulting partially condensed mixture through a cooling zone to condense the lower boiling component of said two components, whereby two immiscible liquids are obtained;

d. blending said two immiscible liquids in a homogenizing zone to obtain a generally uniform mixture;

e. expanding and converting at least said lower boiling component to a gaseous state in a closed evaporating zone, thereby producing a refrigeration temperature adjacent said evaporating zone which is colder than −55°C; and f. evaporating said higher boiling component, thereby obtaining said mixture of refrigeration components of step (a) for recycling of said mixture of refrigeration components in accordance with said closed cycle heat exchange process.

* * * * *